March 15, 1949. J. L. FORD Re. 23,091

METER MOUNTING

Original Filed April 30, 1945

INVENTOR.
JOHN L. FORD,
BY
Hood & Kahn
ATTORNEYS.

Reissued Mar. 15, 1949

Re. 23,091

UNITED STATES PATENT OFFICE 23,091

METER MOUNTING

John L. Ford, Wabash, Ind., assignor to The Ford Meter Box Company, Inc., Wabash, Ind., a corporation of Indiana Original No. 2,438,497, dated March 30, 1948, Serial No. 591,140, April 30, 1945. Application for reissue December 27, 1948, Serial No. 67,441

8 Claims. (Cl. 285—3)

The present invention relates to meter mountings, and is particularly concerned with the provision of an extremely inexpensive, yet efficient, mounting for a water meter, so constructed as to locate the meter at an elevation slightly above that of the service line, and having numerous operational and manufacturing advantages. The invention disclosed herein is an improvement upon, and an advance over, the similar structure disclosed and claimed in my copending application Serial No. 574,900, filed January 27, 1945, for "Shallow meter mounting," now abandoned.

Further objects of the invention will appear as the description proceeds.

To the accomplishment of the above and related objects, my invention may be embodied in the form illustrated in the accompanying drawings, attention being called to the fact, however, that the drawings are illustrated only, and that change may be made in the specific construction illustrated and described, so long as the scope of the appended claims is not violated.

Figure 1:
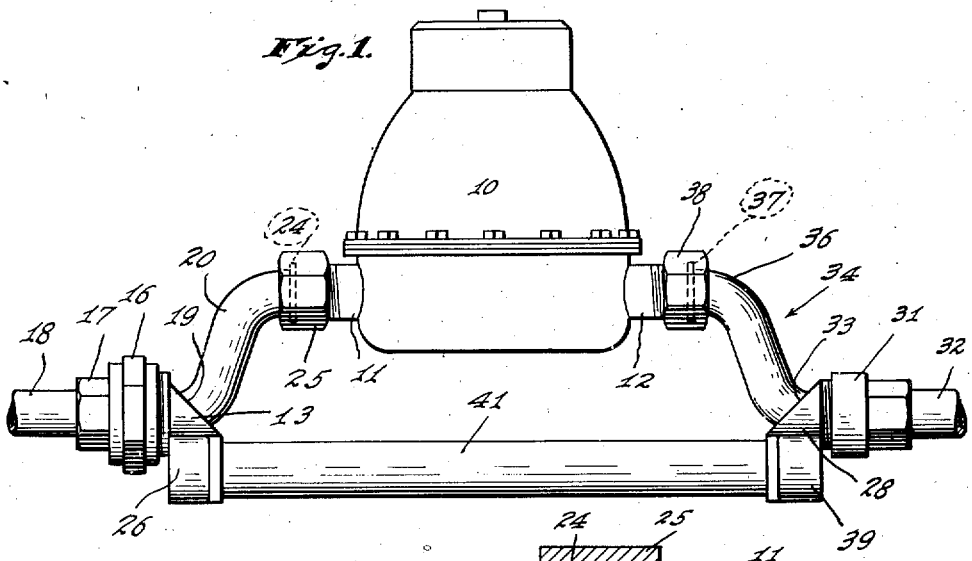
Fig. 1 is a side elevation of a meter mounting constructed in accordance with the present invention showing a conventional water meter supported thereby.
Figure 2:
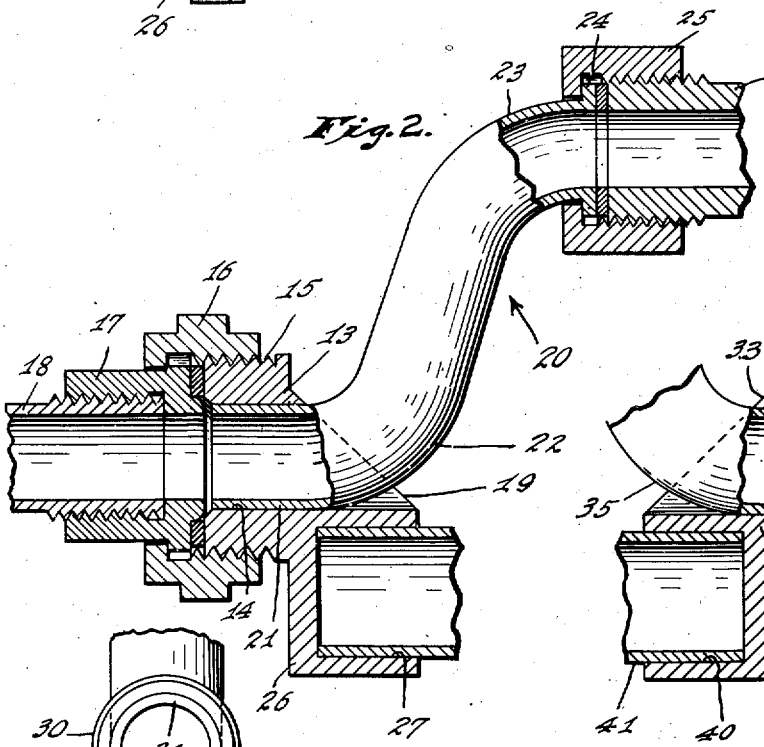
Fig. 2 is a fragmental side elevation, upon an enlarged scale, of one end of my improved mounting, parts being shown in section for clarity of illustration.
Figure 3:
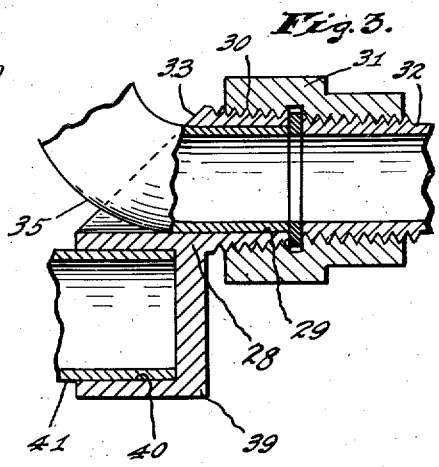
Fig. 3 is a similar view of the opposite end of such meter mounting.
Figure 4:
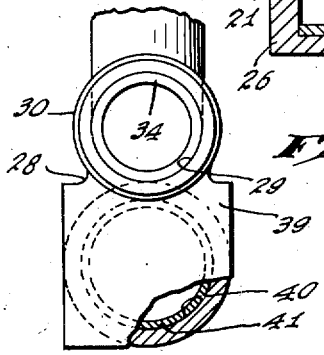
Fig. 4 is a fragmental end elevation of the portion of the meter mounting shown in Fig. 3.

In the drawings, I have shown a conventional water meter having the usual connection spuds 11 and 12 projecting oppositely from its base. My invention comprises a pair of special fittings, one of which is indicated generally by the reference numeral 13. Each such fitting is preferably a brass casting, and is formed to provide a straight-through passage 14, open at its opposite ends. At one end, the fitting is formed, about the open end of the passage, with means designing the fitting to be connected to one element 18 of a supply line. This means may take any suitable form. In the present drawings, the fitting 13 is shown provided with an external thread 15 upon which is threadedly mounted a coupling 16 having a flanged swivel connection with a nut 17 adapted to be threaded onto the threaded end of the portion 18 of the supply line.

The opposite end of the fitting is sharply inclined upwardly and toward said first-mentioned end, so that the overall length of the fitting 13, at its upper portion, is materially less than the overall length of said fitting at its lower portion.

Received in the passage 14, and extending from end to end thereof to constitute the flow passage through the fitting, is one end portion 21 of a ductile tube, indicated generally by the reference numeral 20, and preferably formed of copper. It will be seen that said tube is sharply bent upwardly, as at 22, as it emerges from the passage 14 at the inclined end 19 of the fitting. It will readily be perceived that, because of the inclination of the end 19 of the fitting, this bend 22 in the tube 20 may be made much closer to the union than would be possible if the end 19 of the fitting were square.

The tube 20 extends an appreciable distance out of the line of the axis of the passage 14, and there is curved again, as at 23, to locate its free end upon an axis substantially parallel with the axis of the passage 14. At its free end, the tube 20 may be flanged, as at 24, for cooperation with a coupling 25 adapted to be threaded onto the meter spud 11. Thus the fitting 13, with its tube 20 and its coupling means, provides communication between the section 18 of the supply line and the meter spud 11.

Preferably integral with the fitting 13, and depending from the lowermost portion thereof at the extremity of said fitting, is a portion 26 formed with a socket 27 whose axis is substantially parallel with the axis of the passage 14, said socket opening away from that end of the fitting which is coupled to the supply line.

A second fitting 28, functionally identical with the fitting 13, is provided with a straight-through passage 29 and with means at one end designed to permit said fitting to be coupled into the supply line. This fitting 28 is shown externally threaded as at 30 for cooperation with a nut 31 oppositely threaded at its opposite ends for cooperation with the fitting threads 30 and with the threads upon the section 32 of the supply line. Again, it is to be noted that any suitable form of coupling means may be provided upon either or both of the fittings 13 and 28, depending upon the environment in which the meter mounting is to be used.

The opposite end of the fitting 20 is sharply inclined, as at 33, upwardly and toward said first-mentioned end of said fitting.

A ductile tube 34 is associated with the fitting, having one end positioned in the passage 29 and extending from end to end thereof. As said tube emerges from the inclined end 33 of the fitting, it is bent sharply upward, as at 35; and adjacent its free end, said tube is bent again, as at 36, into substantial parallelism with the axis of the passage 29. At said free end, the tube 34 may preferably be flanged, as at 37, for cooperation with a coupling nut 38 adapted to be threaded onto the meter spud 12. The free ends of the tubes 20 and 34 are intended to be disposed in substantial alignment, as shown.

Preferably integral with the fitting 28, and depending from the lowermost portion thereof at its extremity is a portion 39 formed with a socket 40 whose axis is parallel with the axis of the passage 29, and which opens away from the first-mentioned end of said fitting. The socket 40 is intended to be disposed in axial alignment with, and in facing relation with, the socket 27. A member, shown in the present drawings as a tube section 41, has its opposite ends respectively received in, and secured in place in, the sockets 27 and 40, whereby the fittings 13 and 28 are assembled in a solid structure. As so assembled, the passages 14 and 28 are disposed in axial alignment, and the ends 19 and 33 of said fittings incline upwardly and away from each other.

The advantages of the present structure reside in the fact that very small amounts of relatively expensive brass are incorporated in the fittings, the two fittings 13 and 28 may be identical and interchangeable, the connector whose opposite ends are secured in the sockets 27 and 40 may be made of extremely inexpensive metal, and the inclination of the ends 19 and 33 of the fittings permits the use of extremely short sections of ductile tube, while nevertheless providing room enough, at the lowermost portions of the fittings for socketed elements 26 and 39.

I claim as my invention:

1. A meter mounting comprising a pair of fittings arranged to provide oppositely-facing aligned open ends designed for connection to supply line conduits, a ductile tube for each of said fittings, each of said tubes extending through its fitting to constitute the fluid conduit through said fitting and being curved in one direction out of the line of said open ends and further being curved into parallelism with said line, the free ends of said tubes being designed for connection with the spuds of a meter, each of said fittings further being formed to provide a socket opening in a direction away from said open fitting ends, the sockets of said two fittings being disposed upon a common axis substantially parallel with the common axis of said open ends and spaced therefrom in a direction diametrically opposite said one direction, and an element having its opposite ends received in said fitting sockets and securing said fittings together.

2. A meter mounting comprising a pair of fittings each formed with a straight-through passage, said fittings being arranged with their passages in axial alignment, a ductile tube for each of said fittings, each tube extending from end to end of its fitting passage, and that portion of each tube nearest the opposite fitting being curved in one direction out of the common line of said passages and further being curved into parallelism with said common line, the portions of said tubes parallel with said common line being substantially aligned with each other, each of said fittings further being formed to provide a socket opening toward the other of said fittings, said sockets being axially aligned and offset in the opposite direction from said common line, and an element having its opposite ends secured in said sockets.

3. A meter mounting comprising a pair of fittings each formed with a straight-through passage, said fittings being arranged with their passages in axial alignment, that end of each fitting remote from the other fitting being designed for connection to a supply line conduit, and that end of each fitting adjacent the other fitting being upwardly inclined away from such other fitting, a ductile tube received in the passage of each of said fittings, each tube being curved upwardly as it leaves the inclined end of its fitting and further being curved toward its fellow at its free end into substantial parallelism with the common axial line of said fitting passages, each fitting further being provided with a socketed portion depending from the lower part of its inclined end, the sockets of said portions opening toward each other in axial alignment, and an element having its opposite ends secured in said sockets.

4. A meter mounting comprising a pair of fittings each formed with a straight-through passage, said fittings being arranged with their passages in axial alignment, that end of each fitting remote from the other fitting being designed for connection to a supply line conduit, and that end of each fitting adjacent the other fitting being upwardly inclined away from such other fitting, a ductile tube received in the passage of each of said fittings, each tube being curved upwardly as it leaves the inclined end of its fitting and further being curved toward its fellow at its free end into substantial parallelism with the common axial line of said fitting passages, each fitting further being provided with a socketed portion depending from the lower part of its inclined end, the sockets of said portions opening toward each other in axial alignment and being bodily disposed inwardly beyond the uppermost portions of the inclined ends of their fittings, and an element having its opposite ends secured in said sockets.

5. A meter mounting comprising a pair of fittings arranged to provide oppositely-facing aligned open-ends designed for connection to supply line conduits and mutually-facing aligned open ends sharply bevelled to provide faces inclined from the common axis of said fittings, whereby each such fitting is given a long side and a short side, connector means integral with the long side of each fitting and disposed upon an axis parallel with said common axis, a ductile tube for each of said fittings, each such tube having a portion disposed in the passage of its fitting, a portion curving sharply away from said common axis in the direction of the short side of such fitting, and a portion having its axis parallel with said common axis, said last-named portion of each tube being designed for connection with a meter spud, and means mutually associated with the connector means of both fittings for retaining said fittings in a predetermined spaced relation to each other.

6. A meter mounting comprising a pair of cast brass fittings arranged to provide oppositely-facing aligned open ends designed for connection to supply line conduits and mutually-facing aligned open ends sharply bevelled to provide faces inclined from the common axis of said fittings, whereby each such fitting is given a long side and a short side, a blind stud integral with the long side of each fitting and disposed upon an axis parallel with said common axis, a ductile tube for each of said fittings, each such tube having a portion disposed in the passage of its fitting, a portion curving sharply away from said common axis in the direction of the short side of such fitting, and a portion having its axis parallel with said common axis, said last-named portion of each tube being designed for connection with a meter spud, and a galvanized iron element having its opposite ends connected to said studs, respectively, to retain said fittings in a predetermined spaced relation to each other.

7. A meter mounting comprising two fittings arranged to provide oppositely-facing aligned open ends designed for connection to supply line conduits, one of said fittings further having an open end facing the other of said fittings and sharply bevelled to provide a face inclined from the common axis of said first-named ends, whereby said one fitting is given a long side and a short side, connector means integral with the long side of said one fitting, connector means integral with said other fitting, said connector means of said respective fittings being disposed upon a common axis parallel with the common axis of the first-named ends of said fittings, conduit means for each of said fittings, each such conduit means communicating with the passage of its fitting and having an end portion whose axis is parallel with, but offset from, the common axis of the first-named ends of said fittings and the common axis of said connector means, said end portion of each conduit means being designed for connection with a meter spud, the conduit means for said one fitting comprising a ductile tube having, in addition to said one end portion, a portion disposed in the passage of its fitting, and a portion curving sharply away from the common axis of the first-named ends of said fittings in the direction of said short side of said one fitting, and communicating with said one end portion of said tube, and means mutually associated with the connector means of both fittings for retaining said fittings in a predetermined spaced relation to each other.

8. As an article of manufacture, a fitting to form an element of a meter mounting, said fitting being formed with a straight-through passage, one end of said fitting being designed for connection to a supply line conduit and the other end of said fitting being sharply bevelled to provide a face inclined to the axis of said passage, whereby said fitting is given a long side and a short side, a ductile tube having a portion disposed in said fitting passage, a portion emerging from said passage through said inclined face and curving sharply away from the axis of said passage in the direction of the short side of said fitting, and a terminal portion having its axis parallel with the axis of said passage, said last-named portion of said tube being designed for connection with a meter spud, and a blind stud integral with the long side of said fitting and provided with a socket opening in the direction of said other end of said fitting and disposed upon an axis parallel with the axis of said passsage.

JOHN L. FORD.

No references cited in reissue patent